(12) United States Patent
Anderson et al.

(10) Patent No.: US 8,108,620 B2
(45) Date of Patent: Jan. 31, 2012

(54) COOPERATIVE CACHING TECHNIQUE

(75) Inventors: Eric A. Anderson, Palo Alto, CA (US); Christopher E. Hoover, Campbell, CA (US); Xiaozhou Li, Cupertino, CA (US); Allstair Veitch, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 12/400,991

(22) Filed: Mar. 10, 2009

(65) Prior Publication Data

US 2010/0235581 A1 Sep. 16, 2010

(51) Int. Cl.
*G06F 13/00* (2006.01)

(52) U.S. Cl. .......................... 711/141; 711/130

(58) Field of Classification Search .................. 711/130, 711/141
See application file for complete search history.

(56) References Cited

U.S. PATENT DOCUMENTS

| | | | |
|---|---|---|---|
| 5,796,979 A * | 8/1998 | Arimilli et al. | 711/142 |
| 6,055,605 A * | 4/2000 | Sharma et al. | 711/130 |
| 6,516,391 B1 * | 2/2003 | Tsushima et al. | 711/146 |
| 2006/0248286 A1* | 11/2006 | Scott et al. | 711/141 |
| 2007/0005865 A1* | 1/2007 | Spry et al. | 710/306 |
| 2010/0005247 A1* | 1/2010 | Petersen et al. | 711/146 |

OTHER PUBLICATIONS

Daniel D. Sleator et al., Amortized Effciency of List Update and Paging Rules, Communications of the ACM, vol. 28, No. 2 (Feb. 1985), pp. 202-208.

John T. Robinson et al., Data Cache Management Using Frequency-Based Replacement, Association of Computing Machinery (1990), pp. 134-142.

Avraham Leff et al., Replication Algorithms in a Remote Caching Achitecture, IEEE Transactions on Parallel and Distributed Systems, vol. 4, No. 11 (Nov. 1993), pp. 1185-1204.

Elizabeth J. O'Neil et al., The LRU-K Page Replacement Algorithm For Database Disk Buffering Association of Computing Machinery (1993), 10 pages.

Michael D. Dahlin et al., Cooperative Caching: Using Remote Client Memory to Improve File System Performance, Proceedings of the First Symposium on Operating Systems Design and Implementation (OSDI 1994), 14 pages.

Theodore Johnson et al., 2Q: A Low Overhead High Performance Buffer Management Replacement Algorithm, in Proc. 20th VLDB, Sep. 1994, 12 pages.

Thomas E. Anderson et al., Serverless Network File Systems, 15th ACM Symposium on Operating Systems Principles (Dec. 1995), 21 pages.

Michael J. Feeley et al., Implementing Global Memory Management in a Worstation Cluster, 15th ACM Symposium on Operating Systems Principles (Dec. 1995), 12 pages.

Avraham Leff et al., Efficient LRU-Based Buffering in a LAN Remote Caching Architecture, IEEE Transactions on Parallel and Distributed Systems, vol. 7, No. 2 (Feb. 1996), pp. 191-206.

Elizabeth J. O'Neil et al., An Optimality Proof of the LRU-K Page Replacement Algorithm, Journal of the ACM, vol. 46, Nov. 1996, pp. 92-112.

(Continued)

*Primary Examiner* — Reba I. Elmore

(57) ABSTRACT

A method of caching data in a global cache distributed amongst a plurality of computing devices, comprising providing a global cache for caching data accessible to interconnected client devices, where each client contributes a portion of its main memory to the global cache. Each client also maintains an ordering of data that it has in its cache portion. When a remote reference for a cached datum is made, both the supplying client and the requesting client adjust their orderings to reflect the fact that the number of copies of the requested datum now likely exist in the global cache.

20 Claims, 5 Drawing Sheets

OTHER PUBLICATIONS

Prasenjit Sarkar et al., Hint-based Cooperative Caching, Feb. 22, 1998, 22 pages.

Renu Tewari et al., Design Considerations for Distributed Caching on the Internet, in Proc. 19th ICDCS, May 1999, 12 pages.

Alec Wolman et al., On the scale and performance of cooperative Web proxy caching, 17th ACM Symposium on Operating Systems Principles, Operating Systems Review 34(5):Dec. 16-31, 1999, pp. 16-31.

Donghee Lee et al., LRFU: A Spectrum of Policies that Subsumes the Least Recently Used and Least Frequently Used Policies, IEEE Transactions on Computers, vol. 50, No. 12 (Dec. 2001), pp. 1352-1361.

Yuanyuan Zhou et al., The Multi-Queue Replacement Algorithm for Second Level Buffer Caches, 2001 USENIX Technical Conference, 11 pages.

Theodore M. Wong et al., My cache or yours? Making storage more exclusive, USENIX Annual Technical Conference (Jun. 10-15, 2002), pp. 161-175.

Changkyu Kim et al., An Adaptive, Non-Uniform Cache Structure for Wire-Delay Dominated On-Chip Caches, 10th International Conference on Architectural Support for Programming Languages and Operating Systems (2002), 12 pages.

Nimrod Megiddo et al., ARC: A Self-Tuning, Low Overhead Replacement Cache, USENIX File & Storage Technologies Conference (Mar. 31, 2003), 16 pages.

Siddhartha Annapureddy et al., Shark: Scaling File Servers via Cooperative Caching, http://www.scs.cs.nyu.edu/shark/, in Proc. 2nd NSDI, May 2005, 14 pages.

Song Jiang et al., A Locality-Aware Cooperative Cache Management Protocol to Improve Network File System Performance, in Proc. 26th ICDCS, Jul. 2006, 8 pages.

* cited by examiner

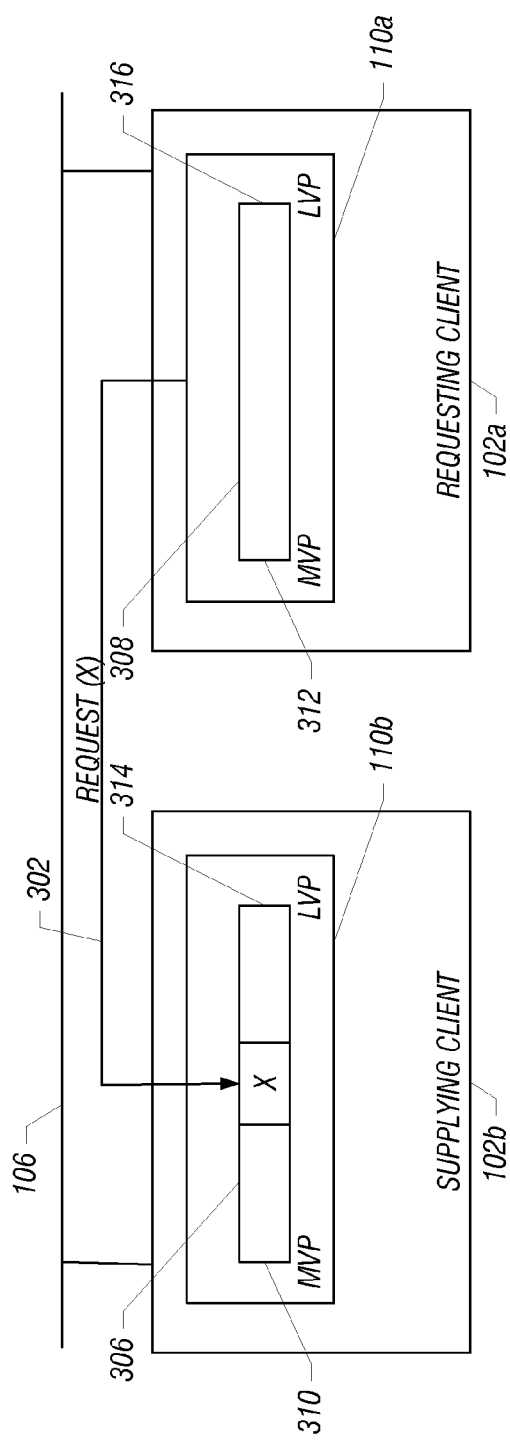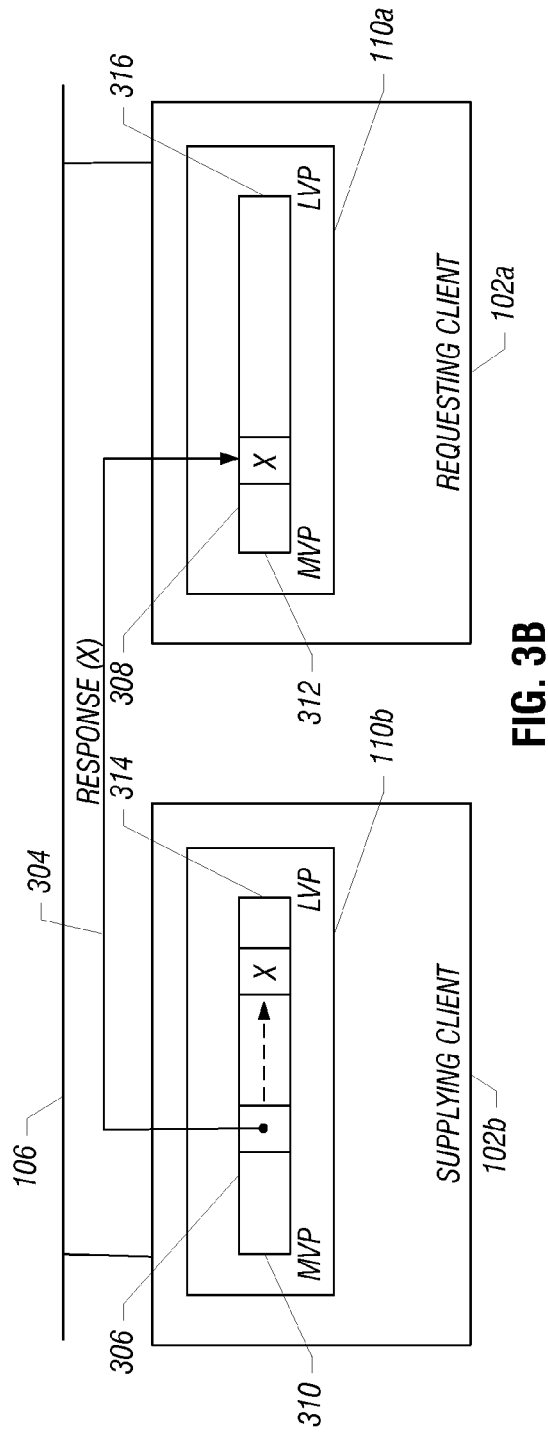
FIG. 3A
FIG. 3B

COOPERATIVE CACHING TECHNIQUE

BACKGROUND

Caching is used in computing systems to address the discrepancy in access times between main memory and disk. A disk cache keeps frequently-referenced data that are stored on the disk in memory so that requests for those data can be returned immediately from memory without the penalty of a slower disk access. Generally, the total size of data accessed by a computing workload exceeds the size of any practical cache. Thus, any cache, after a short time, becomes full, and decisions must be made as to which data should be kept and consequently which data should be discarded in order to maintain the highest overall utility of the cache. These decisions are made by a caching algorithm or, more specifically, by the replacement policy of such an algorithm.

The general goal of any caching algorithm is to maximize the hit rate of the cache, which is the ratio of how many times a requested datum is found in the cache to the total number of accesses. Because caching algorithms typically operate in real time and without knowledge of which data will be accessed, a caching algorithm generally attempts to maximize the hit rate by making an educated guess about the future value of each datum based on the pattern of past accesses. The future value that is assigned to each cached datum generally is an indicator of the likelihood that a particular datum will be requested sooner than the other data in the cache. Thus, by assigning values in this manner and maintaining an ordering of the cached data in accordance with those values, the datum having the least value will be discarded from the cache (when necessary) and replaced whenever a more valuable datum arrives. Note that a caching algorithm need not explicitly keep the values by storing them in variables.

Implementation of a caching algorithm that manages data stored in a local cache (i.e., a local caching algorithm) need only concern itself with assigning values based on the importance of the cached data to the local computing device. However, in complex high-performance computing clusters having a large number of clients that share a global cache, a cooperative caching algorithm may be implemented which values cached data based on global metrics rather than just purely local concerns. In such embodiments, difficulties may be encountered in determining what data to cache, where to cache it, and how to manage communications among the various peers relating to the cached data.

BRIEF DESCRIPTION OF THE DRAWINGS

Some embodiments of the invention are described with respect to the following figures:

FIGS. 3A and 3B illustrate an example of an implementation of an exemplary cooperative caching technique in accordance with an embodiment of the invention.

DETAILED DESCRIPTION

Figure 1:
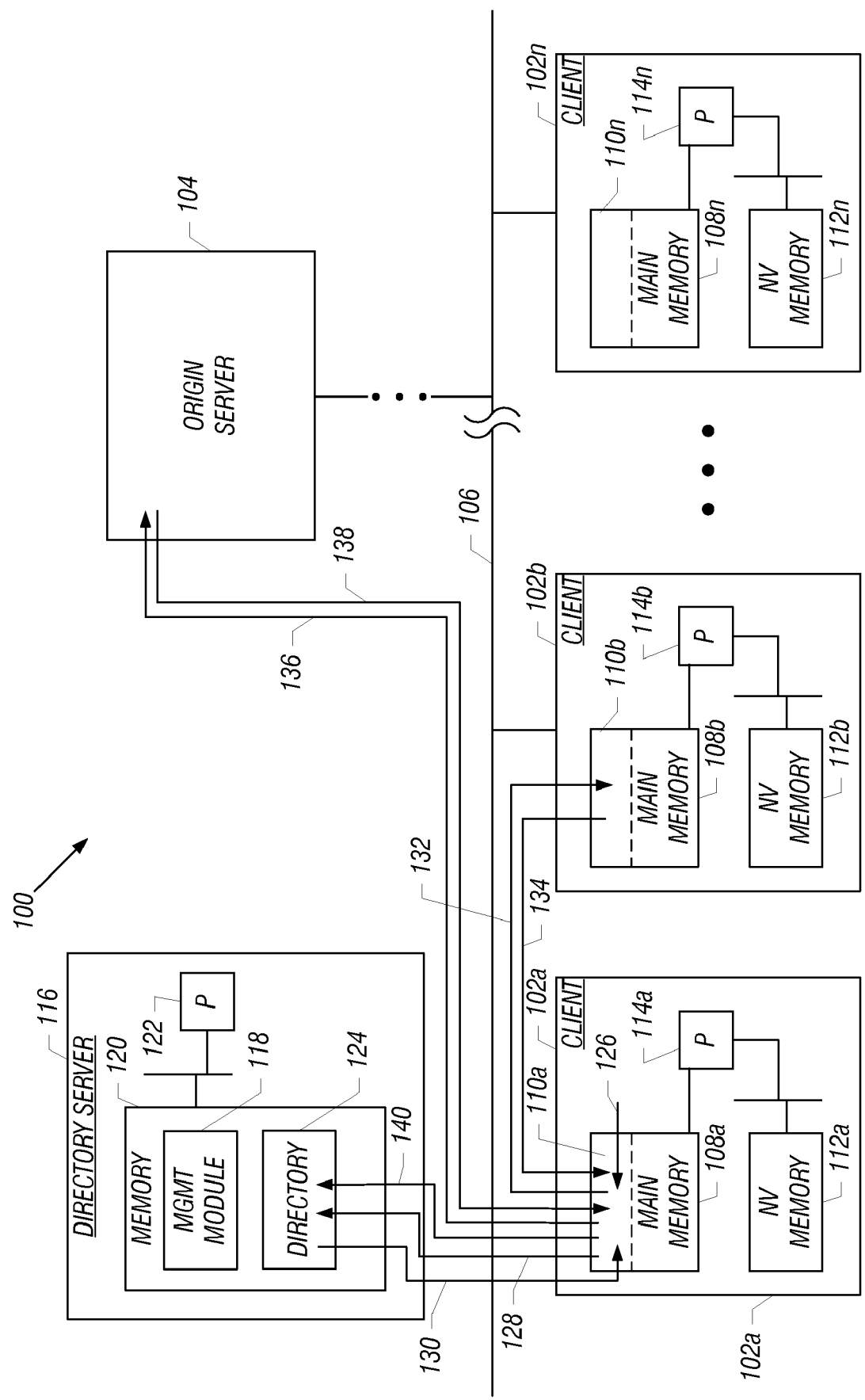
FIG. 1 is an example of a system in which a cooperative caching scheme in accordance with the above principles may be implemented.

There are many known local caching algorithms that are configured to optimize the hit rate of a local cache. In general, local caching algorithms assign values to cached data based on how likely (or not) each particular datum will be requested again soon by the local computing device. Examples of common local caching algorithms are the Least Recently Used (LRU) algorithm, which assigns values based on how recently a particular datum was referenced; and the Least Frequently Used (LFU) algorithm, which assigns values based on how frequently a particular datum is referenced.

At a high level, a local caching scheme maintains an ordering (such as an ordered list or table) of data stored in the cache of the associated computing device, where the order indicates the predicted future value of each datum relative to the other cached data. A datum having the least value is placed in a least-valuable position of the ordering (such as at an end of an ordered list), while a datum having the most value is placed in a most-valuable position of the ordering (such as at the other end of the ordered list). In this way, data that are considered the least valuable will be evicted from the cache sooner than data that are perceived as having more value.

To maintain the ordering, the caching algorithm re-assigns values to cached data whenever a datum is referenced. To illustrate: when a particular datum is referenced by the computing device, if the datum is in the cache (i.e., a "hit"), then the cache returns the datum to the device and then adjusts the ordering. For instance, an LRU caching algorithm reorders an ordered list such that the just-referenced datum is placed at the most-recently-used (MRU) end of the list, indicating that it is now considered to have the highest value relative to the other cached data. If a referenced datum is not in the cache (i.e., a "miss"), then the referenced datum is read from permanent storage. The least valuable datum in the cache is evicted to make room for the newly read-in datum (if necessary), and the list is reordered to reflect the new relative values of the cached data. For an LRU caching scheme, the evicted datum is taken from the least-recently-used end of the list, the newly read-in datum is placed in the most-valued position at the MRU end of the list, and the values of the other cached data are adjusted accordingly. Other local caching algorithms may predict future values and implement reordering in different manners. However, the replacement policies of these algorithms are based on the principle of maximizing the hit rate by assigning relative future values to cached data in a manner that ensures that data that is least likely to be accessed again soon is discarded in favor of data that is more likely to be accessed. In effect, the estimated future value of each cached datum is encoded by the datum's position in the ordering.

While such local caching algorithms work well to maximize the hit rate in local caches, these algorithms do not address the needs of high-performance computing clusters, in which a small number of servers serve system contents over a network to a much larger number of clients. It is common for servers in clusters to become bottlenecks, with the limiting factor for performance being the size of their disk caches. The size of the cache of any server (or indeed the total size of the caches of any set of servers) is generally too small to ensure high cache hit rates with typical workloads. As a result, clients may see significant input/output wait times as the servers perform disk accesses.

One solution to improve hit rate and performance of a large computing cluster is to deploy dedicated caching appliances ahead of the servers. While this arrangement increases the effective total cache size of the servers and does provide some benefit, a fundamental imbalance remains between the number of caching appliances and servers and the number of clients accessing the content stored on those servers. That is, the effective total cache size remains constant even as more clients are added to the system, thus once again ultimately degrading system performance.

To address this imbalance and inability to adapt to growth of the computing cluster, a cooperative caching scheme may be used. In cooperative caching, every client dedicates a portion of its main memory to caching and attempts to satisfy requests from its peers for system contents. By distributing the cache functionality among a set of peers, a large aggregate (or global) cache may be formed that has a total size that is larger than any single cache practically can be. In such an arrangement, peers respond to cache requests from each other, thus reducing the need to direct time-consuming data requests to the origin servers. Because the size of a cooperative cache, by definition, scales with the number of peers, as peers are added, the cache size increases, thus providing an advantage over a system having dedicated caching appliances. The trade-off for a cooperative caching system, however, is added complexity in managing the distributed nature of such a cache. This includes the complexity of the communication between the peers and the difficulty of determining what to cache and where to cache it.

For instance, considerations influencing the assignment of values to cached data are different in a cooperative caching scheme since the caching algorithm should view value based on global metrics rather than just simply local metrics. In cooperative caching, a client cache serves not only local references for data, but also remote references (i.e., those references that come from other clients). Like a local caching algorithm, a goal of a cooperative caching algorithm is to reduce the load on the origin server. However, a cooperative caching algorithm should also consider all computing devices in the system and attempt to balance the load among them. Thus, when attempting to maximize hit rate, the cooperative caching algorithm should not do so by overloading one or more of the client devices, such as a client that caches a popular datum for which many requests are received.

Another global concern in a cooperative caching system is that multiple copies of the same datum may exist in the local caches of multiple peers. Since replication of the same datum effectively reduces the size of the global cache, an efficient cooperative caching technique may value cached data in a manner that attempts to reduce the number of duplicates in the global cache.

Associated with the concern of reducing the number of replicas is the recognition that a singlet (i.e., a datum for which only a single copy exists in the global cache) is highly valuable because, by definition, if discarded it can only be obtained again from the origin server, a costly operation. Thus, a cooperative caching algorithm may attempt to maximize the chance that singlets will remain in the global cache, such as by forwarding evicted singlets among peers in an intelligent manner.

An exemplary embodiment of a system 100 in which a cooperative caching scheme in accordance with the above principles may be implemented is illustrated in FIG. 1. Here, the computing system 100 is a large-scale, file-level, cooperative caching system in which a plurality of clients or work stations 102a-n communicate with one or more origin servers 104 via a network 106. The network 106 may include, for example, a local area network (LAN), a wide area network (WAN), a storage area network (SAN), the Internet or any other type of communication link. In the embodiment shown, each client 102a-n is a computing device which includes a main memory 108a-n, a portion 110a-n of which is used as part of the cooperative cache. In one embodiment, a nontrivial amount 110a-n of main memory 108a-n, such as one gigabyte, is used as part of the cooperative cache, although other amounts of memory may be allocated to the global cache as appropriate depending on the configuration of the system 100.

In general, in system 100, the clients 102a-n access data from the origin server 104. However, the servers 104 can be slow either because of excessive load or because it is remotely accessed over a relatively slow network connection. To reduce the delay incurred due to accesses to the origin servers 104, a cooperative caching technique is implemented in the system 100. In the embodiment shown, the caching technique is implemented as software code stored in a non-volatile memory 112a-n in at least each of the clients 102a-n participating in the global cache and executed by a client processing device 114a-n. In other embodiments, the technique may be implemented as a combination of software and hardware, firmware, or other structures as may be appropriate for the particular application in which the technique is used.

To manage communications among the clients 102a-n and to track locations of cached data, the system 100 also includes a directory server or manager 116. It should be understood, however, that other embodiments of the system 100 which implement the cooperative caching scheme may manage communications and track cached data using techniques other than a directory server 116. For instance, one or more of the clients may participate in management of communications regarding cached data, such as by passing hints among the clients 102a-n regarding the locations of data, using a distributed hash table distributed amongst the clients 102a-n that provides a lookup service, etc.

In the embodiment shown in FIG. 1, a management portion 118 of the caching technique is implemented as software code stored in a memory 120 of the directory server 116 and executed by a processing device 122. In accordance with its management function, the directory server 116 receives data references from the clients 102a-n and responds to those requests with a list of possible locations (if any) for the referenced data. In one embodiment, the directory server 116 tracks cached data by maintaining a directory 124 (e.g., one or more tables or lists) that maps data identifiers to a list of clients 102a-n that may currently cache the data. When a client's cache contents change, the change is communicated to the directory server 116 such that the directory server 116 may update its directory 124 accordingly. Even with these update messages, however, it is possible that the directory server's mappings 124 may not be completely up to date.

To illustrate communications between clients 102a-n, the directory server 116 and the origin server 104, an exemplary path that a client 102a takes to obtain a referenced datum is represented by the arrows shown in FIG. 1. In the following description, the datum will be referred to as a chunk, which should be understood to mean a datum of fixed size. As represented by arrow 126, the client 102a requests the chunk. If the data is not found in the client's portion 110a of the global cache, the client 102a sends a message to the directory server 116 asking for locations of the chunk (arrow 128). The directory server 116 replies with a (possibly empty) list of clients that may be caching the chunk (arrow 130). If the list is not empty, the client 102a sends a request to at least one of the clients (e.g., client 102b) on the list, asking for the data chunk (arrow 132). The client 102b replies with the chunk (if the client 102b indeed has the chunk stored in its cache portion 110b) (arrow 134). If the client 102b does not have the chunk, it declines the request. The requesting client 102a will then attempt to obtain the chunk from another client on the list (if any). If the client list received from the directory server 116 is empty, the client 102a requests the chunk from the origin server 104 (arrow 136) and the origin server 104 sends back the chunk (arrow 138). The requesting client 102a caches the chunk and sends an update message to the directory server 116 informing it of the addition of the chunk to the client's portion 110a of the global cache (arrow 140).

In some embodiments, the directory server 116 may improve the quality of the client list by removing from the directory 124 those clients 102a-n that it has not heard from in a long time, which may indicate that the client is either congested or no longer operable. In some embodiments, the directory server 116 may respond to each request with a random permutation of the client list in order to distribute chunk requests among those clients that might have the desired chunks. Yet further, if the number of clients 102a-n on the list exceeds a predetermined amount, the directory server 116 may prune the list to a pre-specified length, thus reducing the overhead required to maintain and communicate the list to a requesting client.

Figure 2:
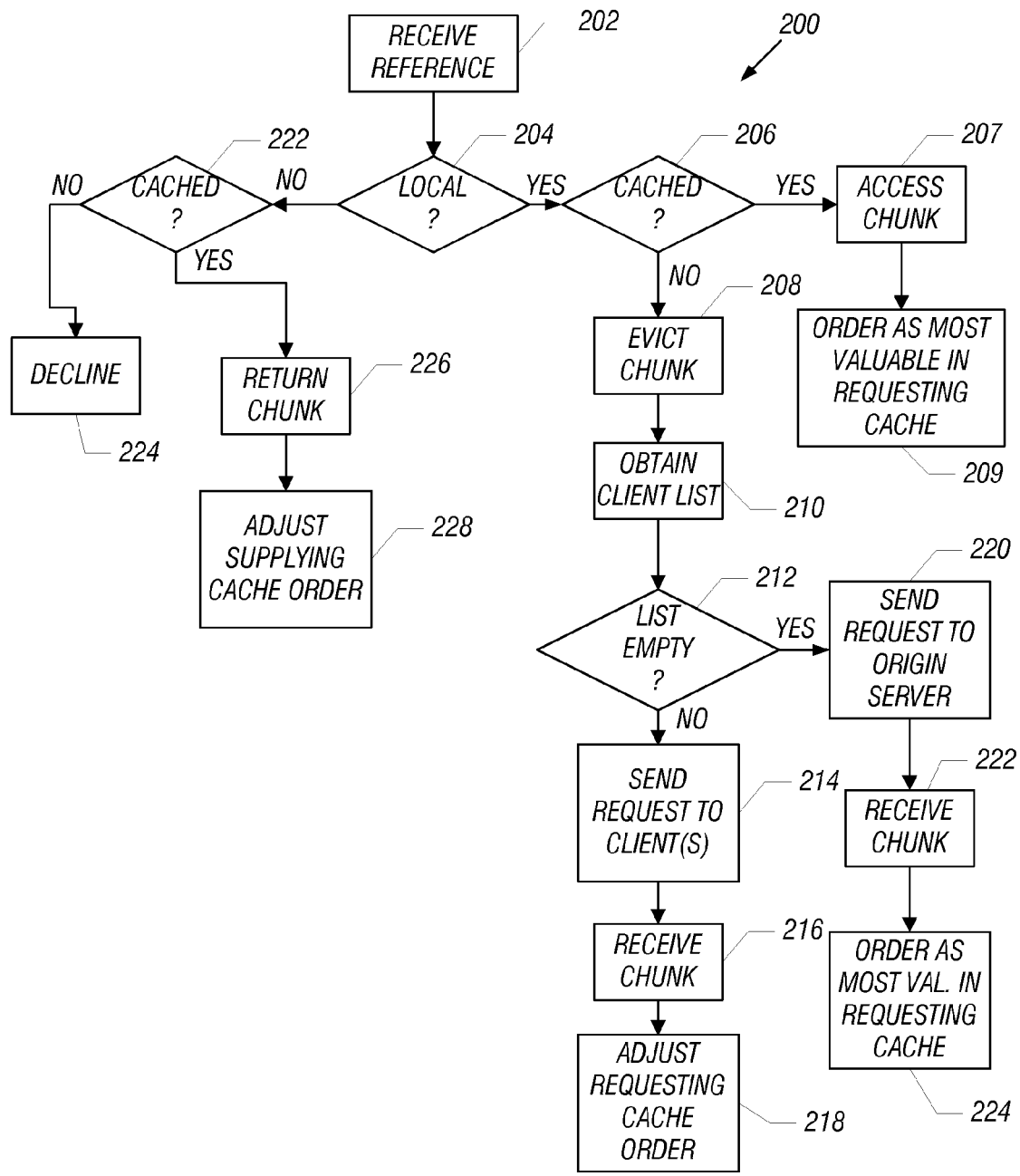
FIG. 2 is a flow diagram of an exemplary cooperative caching technique in accordance with an embodiment of the invention.

FIG. 2 illustrates one exemplary embodiment of a cooperative caching technique 200 that may be implemented in the system 100 of FIG. 1, for instance. In accordance with this technique, global considerations are taken into account in adjusting the order of cached data. As an example, for local caching algorithms, a just-referenced chunk typically is assigned a high value relative to other locally cached chunks. However, in cooperative caching, the chunk's value in fact may be reduced when the total contents of the global cache are also considered. For instance, if the just-referenced chunk was obtained from the origin server 104, then it should be ordered in the requesting client's portion 110 of the global cache in a manner that reflects the fact that it is the only copy of that chunk in the global cache (i.e., a singlet).

As another example, the ordering of a referenced chunk in a client's cache portion 110 may take into account whether the reference for that chunk was local or remote. For a local reference, the value of the chunk is adjusted based on the likelihood that it will be locally referenced again. In general, a local reference for a chunk may increase the chunk's value to the requesting client. However, a remote reference raises different considerations that affect the value of the chunk for both the requesting client and the supplying client. The reason for these differences is that the value of the chunk to both requesting and supplying clients also depends, in part, on how easily it can be obtained again if it is evicted. A remote reference for the chunk implies that at least two clients—the requesting client 102a and the supplying client 102b—have replicas in their respective cache portions 110a and 110b. Because of the duplication, the value of the chunk to the supplying client 102b relative to its value prior to the remote reference is reduced, and the value of the chunk to the requesting client 102a is less that the value that would have been assigned to a locally referenced chunk or a chunk that was obtained from the origin server 104. Accordingly, for a remote reference, both the supplying client 102a and the requesting client 102b may adjust ordering of their cache portions. Effectively, the estimated future value of each cached chunk is encoded by the chunk's position in each client's cache portion 110. The value of a chunk not only depends on how likely it is to be referenced again, but also on how easy it is to obtain the chunk again if it is evicted.

Thus, turning again to FIG. 2, upon receipt of a chunk reference (block 202), if the reference is local (i.e., the reference comes from the client itself), then the cooperative caching technique determines whether the chunk is stored in the requesting client's cache portion 110 (diamond 204). If so, then the chunk is accessed by the client (block 207) and the cache is reordered to reflect the adjusted future value of the chunk in view of the access (block 209). If the chunk is not cached (diamond 206), then the least valuable chunk is evicted (if there is no room to store the new chunk) (block 208), and an inquiry is sent to the directory server 116 regarding the chunk (block 210). The directory server 116 responds with a list of clients that may have the chunk. The directory server also may provide information indicating the number of replicas of the chunk that are in the global cache. If the received list indicates that another client has the chunk (i.e., the list is not empty) (diamond 212), then a request is sent to at least one of the clients on the list for the chunk (block 214). If multiple requests are sent, they may be transmitted either sequentially or in parallel. When the chunk is received by the requesting client (block 216), the chunk is ordered in the requesting client's cache in a manner that reflects the chunk's predicted future value (block 218), as will be discussed in further detail below.

Returning to step 212, if the response from the directory server 116 indicates that the chunk is not present in another client's cache, then the requesting client retrieves the chunk from the origin server 104 (blocks 220 and 222). In this case, the received chunk is ordered in the most-valuable position in the cache to reflect the fact that it necessarily must be the only copy in the global cache (i.e., it is a singlet) (block 224).

Returning to step 204, if the reference is not local (i.e., the reference was received from a remote client), then the client receiving the request determines if the referenced chunk is in its cache (diamond 222). If not, then the reference is declined (block 224). If so, then the supplying client returns the chunk to the requesting client (block 226). The ordering of the supplying client's cache is then adjusted (block 228).

In the embodiment of the cooperative caching technique illustrated in FIG. 2, both the receiving client and the supplying client adjust their respective orderings in response to a chunk reference (blocks 209, 218, 224 and 228). The adjustments made by the receiving client when the chunk either already was present in the receiving client's cache (block 209) or obtained from the origin server (block 224) have been discussed above. With respect to the adjustments made by the receiving client and supplying client at blocks 218 and 228, respectively, FIGS. 3A and 3B illustrate one example of the manner in which these adjustments may be made. In this example, the orderings are maintained as lists 306 and 308 ordered from a most-valuable position (MVP) 310/312 to a least-valuable position (LVP) 314/316. FIG. 3A illustrates the ordering of the receiving and supplying clients' respective caches 110a and 110b prior to transmittal of a referenced chunk "x". The requesting client 102a sends a request 302 to the supplying client 102b for the chunk "x". As shown in FIG. 3B, the supplying client 102b sends a response 304 providing the chunk "x" and then readjusts the ordering 306 of its cache 110b by moving its copy of the supplied chunk "x" towards the LVP end 314 of the ordering 306. The requesting client 102a adjusts its ordering 308 by placing its copy of the supplied chunk "x" near, but not at, the MVP end 310 of its ordering 306. The placement of the chunk "x" in the orderings 306 and 308 of each of the requesting and supplying clients' caches 110a and 110b reflects the fact that the chunk "x" was remotely referenced, inferring that the chunk's value is reduced because multiple copies now exist in the global cache.

In one embodiment, the position of the chunk "x" in the requesting and supplying clients' orderings is based on the number of replicas of the chunk "x" that already (likely) exist in the global cache. With respect to the requesting client, if the chunk is obtained from the origin server, then it is placed in the most-valuable position of the ordering since it is a singlet (i.e., only one copy exists in the global cache). If the chunk is received from a peer (as illustrated in FIGS. 3A and 3B), then the chunk is placed some distance from the MVP end 312 of the ordering since multiple copies now likely exist. In one embodiment, the chunk may be placed a distance E/k from the MVP end 312 [CONFIRM] of the requesting client's ordering, where E is the number of entries in the cache and k is a pre-defined constant (e.g., 2E). As a result, chunks with a large number of replicas will be evicted sooner than chunks with fewer (or no) replicas.

In another embodiment, the chunk may be placed a distance $(E/k)(n/(n+1))$ from the most-valuable end of the receiving client's ordering, where n is the number of replicas in the global cache. Thus, if n is small (e.g., 1), then the chunk is moved a lesser distance from the MVP end 312 of the ordering, while if n is large (i.e., a large number of replicas exist), then the chunk is moved a greater distance from the MVP end 312 (but never further than E/k).

The supplying client also adjusts its ordering 306 in response to the remote reference for a chunk. Again, the manner in which the ordering 306 is adjusted may be implemented in many different manners. For instance, assuming that at the time that the remote reference is received, the chunk "x" is at distance l from the LVP end 314 of the supplying client's ordering 306 and a distance m from the MVP end 314 the ordering 306, then in one embodiment, the supplying client 102b may move the remotely-referenced chunk "x" to a constant distance l/k from the LVP end 314, where k is a pre-determined constant (e.g., 2). In another embodiment, the supplying client 102b may move the chunk to distance l/n from the LVP end 314 of its ordering 306, where n is the number of replicas in the global cache. Thus, the greater the number of replicas, the closer the chunk is placed to the LVP end 314 and the greater the likelihood that the chunk will be evicted. Alternatively, the supplying client 102b may move the chunk to distance $l/n^2$ from the LVP end 314 of its ordering 306, thus further increasing the likelihood that a chunk with many replicas will be evicted sooner. As yet one other alternative, if m is more than 1/n of the length of the ordering, then the chunk is simply evicted. In other words, if enough replicas of the chunk already exist, then the supplying client 102b does not need to maintain its copy in its cache 110b. Here again, the larger the number of replicas, the sooner the chunk will be evicted from a supplying client's cache 110b. In yet a further alternative, if n is more than a pre-defined constant (e.g., 2), then the supplying client 102b may evict the chunk, again recognizing that there is no need to cache a chunk if sufficient copies of the chunk exist elsewhere in the global cache.

Only a few specific examples have been given for determining the manner in which a requesting client and a supplying client adjust the position of a just-referenced chunk in an ordering. These examples have been based on a least-recently-used type of ordering. In alternative embodiments, other global considerations, such as the frequency of requests for the chunk, may be used instead of or in conjunction with the number of replicas to adjust the ordering of chunks in the cache. Such techniques may be used in conjunction with a different type of cache ordering algorithm, such as a least frequently used algorithm, etc.

Figure 4A:
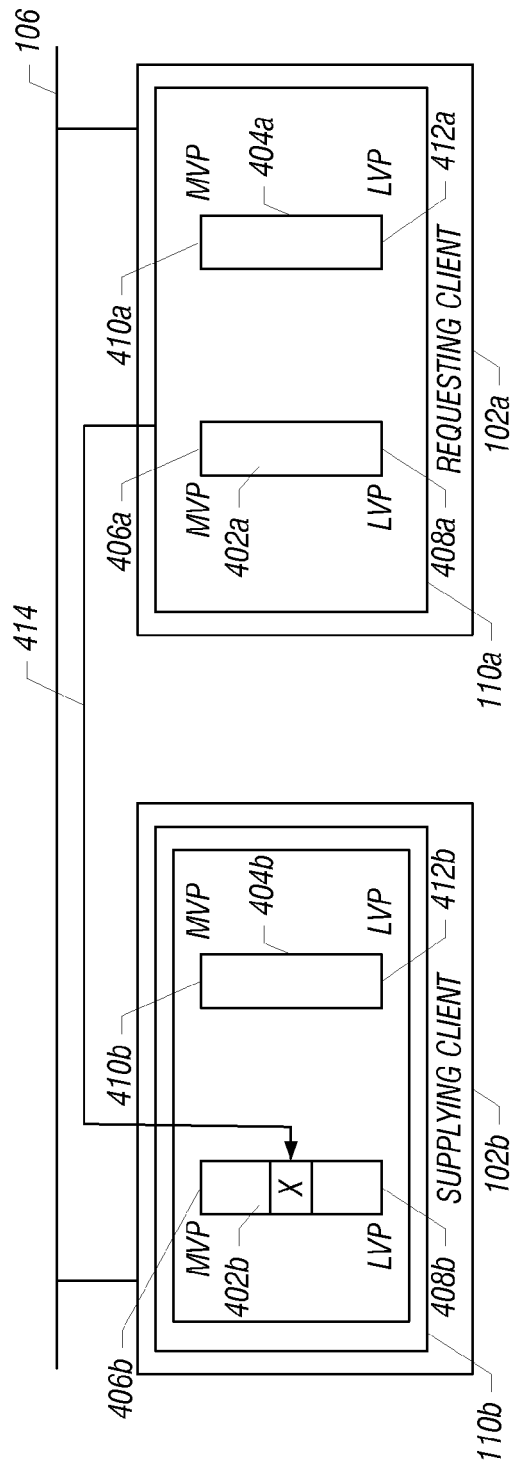
FIGS. 4A and 4B illustrate another example of an implementation of an exemplary cooperative caching technique in accordance with an embodiment of the invention.
Figure 4B:
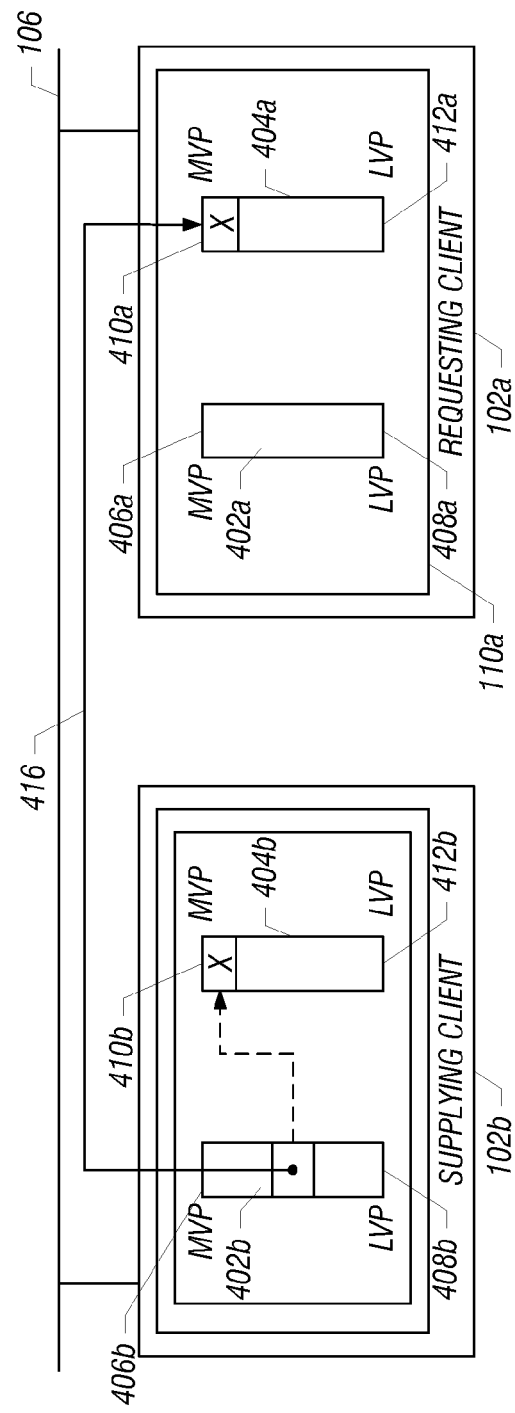

Turning now to FIGS. 4A and 4B, another example of the manner in which requesting and supplying clients may adjust the ordering of cached data in response to a chunk reference is illustrated. In this embodiment, each client 102 in system 100 maintains two orderings which will be referred to as a local ordering 402 (e.g., an L-list which is ordered from an MVP end 406 to an LVP end 408) and a remote ordering 404 (e.g., an R-list which is ordered from an MVP end 410 to an LVP end 412). In general, the remote ordering 404 includes chunks that have been remotely referenced, thus indicating that they are less valuable due to the fact that replicas of those chunks likely exist in the global cache. Accordingly, evictions occur from the remote ordering 404. The local ordering 402, on the other hand, generally includes chunks that have been locally referenced or which came from the origin server and, thus, have a higher value than the chunks in the remote ordering 404.

Returning back to FIG. 2 in conjunction with FIG. 4, the caching technique 200 may use the two orderings 402 and 404 in the following manner. Upon receipt of a reference for a chunk (block 202), if the reference is local (diamond 204) and it is not cached (diamond 206), then a chunk is evicted from the requesting client's remote ordering 404a (if necessary) and/or a chunk is moved from the local ordering 402a to the remote ordering 404a (if necessary) (block 208). A request is sent to the directory server 116 regarding the referenced chunk. The directory server 116 responds to the request with a list of clients that may have the chunk (block 210). If the list is empty (diamond 212), then the requesting client 102a obtains the referenced chunk from the origin server 104 and places it at the MVP end 406a of the local ordering 402a (block 218). If the list is not empty (diamond 212), then the requesting client sends a request for the chunk to at least one of the clients on the directory server's list (block 216). When the chunk is received (block 216), it is placed at the MVP end 410a of the remote ordering 404a to reflect the fact that another copy of the chunk exists in the global cache (block 218). In other embodiments, the chunk received from the supplying client 102b may be placed in the local ordering 402a, such as at a distance removed from the MVP end 406a, depending on the manner in which the requesting client 102a ultimately values the chunk. Returning to step 206, if the referenced chunk is cached by the requesting client 102a, then the chunk is placed in MVP of the ordering in which the chunk already belongs (block 209). For instance, if the chunk was listed in the local ordering 402a, then the chunk is moved to the MVP most-valuable-position in that ordering. Likewise, if the chunk was listed in the remote ordering, then the chunk is moved to the most-valuable position in the remote ordering.

With respect to a client that receives a remote reference for a chunk (diamond 204), if the remotely referenced chunk is cached (diamond 222), then the client 102b supplies the chunk to the requester (block 226). The supplying client 102b then adjusts the position of the requested chunk in its ordering (block 228). For instance, if the supplied chunk was present in the supplying client's local ordering 402b, then the supplied chunk is moved to the remote ordering 404b (in recognition of the fact that replicas now likely exist) and placed, for instance, at the MVP end 410b of the remote ordering 404b. However, if the supplied chunk was already in the remote ordering 404b, then the chunk either simply remains as is in that ordering or is re-positioned to reflect a reduction in value. If, at step 222, the client does not have the remotely referenced chunk, then it simply declines the reference (block 224).

FIGS. 4A and 4B show one example of using local and remote orderings 402 and 404 to adjust values of cached data based on a remote reference for a chunk "x". In FIG. 4A, the requesting client 102a send a request 414 to client 102b for the chunk "x," which client 102b has listed in its local ordering 402b. As shown in FIG. 4B, the supplying client 102b transmits a response 416 returning the chunk "x" to the requesting client. The requesting client 102a places the received chunk "x" in the MVP 410a of its remote ordering 404a. The supplying client moves its copy of chunk "x" from is local ordering 402b to the MPV end 410b of its remote ordering 404b.

In addition to implementing separate orderings 402, 404 that reflect the values of the cached data, the ordering technique described with reference to FIGS. 4A and 4B may also adjust the position of chunks within each ordering 402, 404 to fine tune the predicted future values of the data using the same or similar techniques as described above with reference to FIGS. 3A and 3B. For instance, a referenced chunk may be moved a distance from the MVP 406 or 410 of the ordering 402 or 404, respectively, based on the number of replicas in the global cache.

Figure 5:
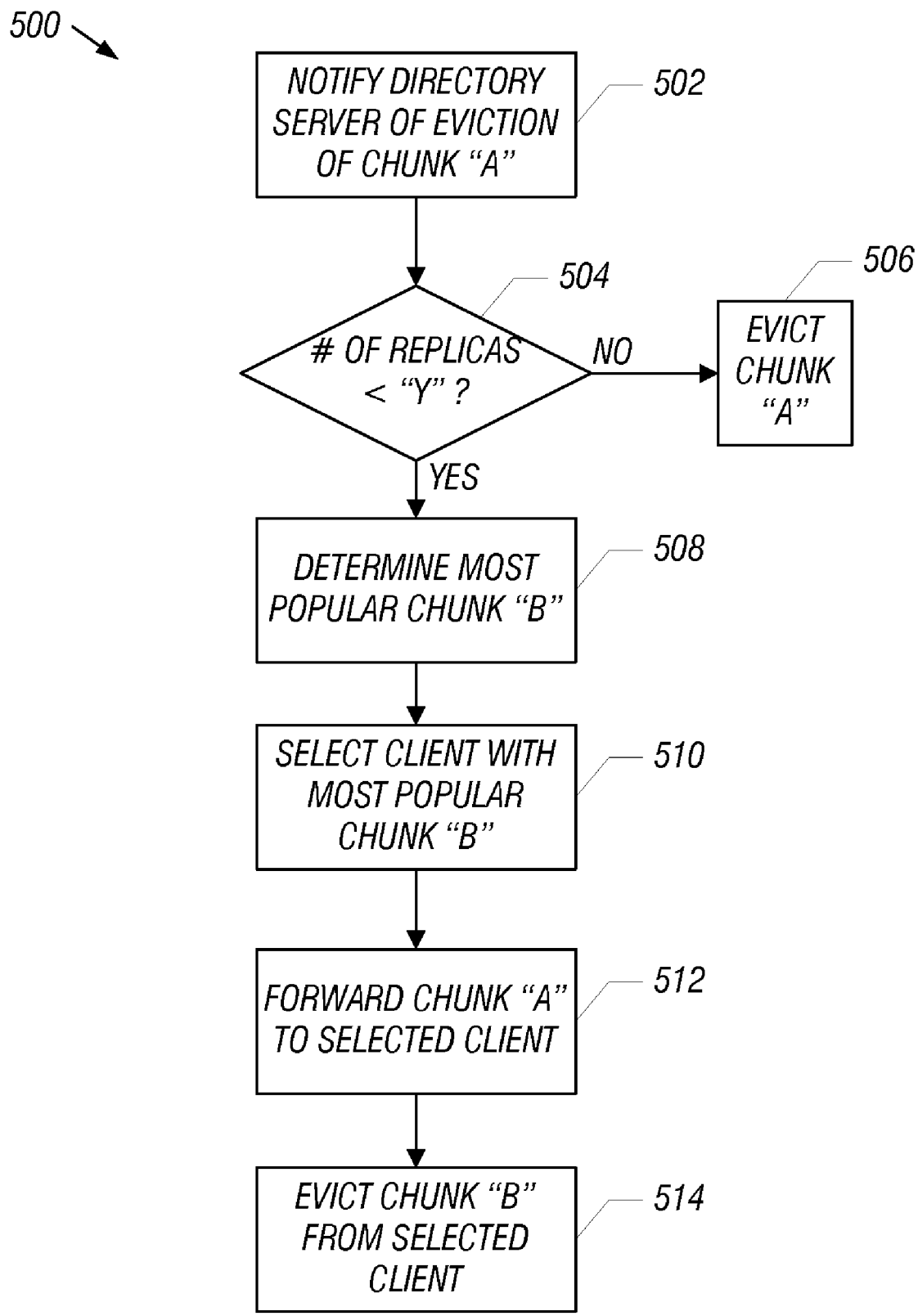
FIG. 5 illustrates a flow diagram of another exemplary cooperative caching technique in accordance with an embodiment of the invention.

Both ordering techniques described above with reference to FIGS. 3A, 3B and 4A, 4B attempt to reduce the number of replicas in the global cache by ordering chunks in a manner that makes it more likely that duplicated chunks will be evicted sooner. However, in some instances, a chunk that is evicted from a cache may be a singlet. If a singlet is evicted, then it necessarily becomes more difficult for all clients 102 in the system 100 to obtain it again. Thus, in one embodiment, the caching technique may take into account that, if an evicted chunk is a singlet, then it should be forwarded to another client, if possible. In accordance with this embodiment, and as illustrated in FIG. 5, rather than simply randomly forwarding the singlet, the forwarding is performed in a selective or targeted manner.

For instance, selection of a client to receive a forwarded singlet may be based on the "popularity" of the chunk in the global cache. Here, "popularity" refers to the number of replicas of a chunk in the global cache. A chunk having the greatest popularity is the chunk having the greatest number of replicas. Since a singlet has a higher global value than a popular chunk, then a great deal of benefit may be obtained by replacing a popular chunk in a client's cache 110 with an evicted singlet.

In one embodiment, targeted forwarding of evicted singlets is implemented under the direction of the directory server 116, which maintains the mapping 124 of which clients have which chunks and the number of replicas of the chunks in the global cache. Thus, as illustrated in FIG. 5 for instance, before evicting a chunk "A", the evicting client 102 may notify the directory server 116 of the impending eviction (block 502). Based on its stored information, the directory server 116 can determine if chunk "A" is a singlet. For instance, in accordance with its management function 118, the directory server 116 may determine whether the number of replicas of the chunk up for eviction is less than a predetermined constant "y" (e.g., 1) diamond 504). If the number of replicas exceeds "y," then the chunk may be evicted from the client's cache 110 (block 506). If the number of replicas is less than "y," then the directory server 116 then the directory server 116 may respond with a message identifying a target client 102 to which the evicted chunk should be transferred. In some embodiments, the message from the directory server 116 may also identify a chunk in the target client's cache portion 110 that should be evicted in favor of the transferred singlet.

Thus, referring again to FIG. 5, in one embodiment, the directory server 116 selects the most popular chunk "B" in the global cache (block 508) and then selects one of the clients 102 with the popular chunk as the target client (block 510). The directory server then responds to the eviction notice identifying a target client 102 to whom chunk "A" should be transferred and a chunk "B" that the target client 102 should evict. The directory server 116 may randomly select as the target any of the clients that have the popular chunk "B". Alternatively, rather than a random selection, the directory server 116 may select the target client 102 based on the age of the replica of the popular chunk "B". The longer a replica has been cached locally, the less likely that it will be locally referenced again. The age of the replica may be determined, for instance, by time stamping the update messages received by the directory server 116 from the clients 102 each time a client 102 obtains a new chunk. In other embodiments, the directory server 116 may base its selection of a target client 102 and chunk "B" on other criteria. However, regardless of the selection method, the directory server 116 responds to an eviction notice for a singlet with a target client 102 to which the singlet should be forwarded. Preferably, the directory server 116 also identifies a chunk "B" that the target client 102 should evict in favor of the transferred chunk "A."

In some embodiments of the invention, this targeted forward technique may be used also to forward evicted chunks that are not singlets but have only a few replicas in the global cache. Thus, for instance, if the directory server 116 determines that the chunk proposed for eviction has less than a pre-defined number (e.g., two) of replicas in the global cache, then the directory server 116 may direct the client 102 forward the chunk "A" to a client 102 that has a chunk "B" with a greater number of replicas than chunk "A."

In other embodiments of the invention, the targeted forwarding implemented shown in FIG. 5 may be combined with a cooperative caching technique that responds to chunk reference in a manner that attempts to reduce the number of replicas in the global cache (e.g., technique 200 shown in FIG. 2). Composing the two types of techniques together should result in better overall performance of the caching algorithm.

Instructions of software described above (including the techniques of FIGS. 2 and 5) are loaded for execution on a processing device (such as one or more CPUs 114 and 122 in FIG. 1). A processing device includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

For any of the techniques discussed above, the technique may include additional, fewer, and/or different steps than those discussed above. Further, in some embodiments, some steps may be performed in a different order than that discussed above and some steps may be performed in parallel or sequentially.

Data and instructions (of the software) are stored in respective storage devices (such as memories 112 and 120 of FIG. 1), which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of cooperatively caching data in a global cache distributed amongst a plurality of computing devices, comprising:
   providing a global cache for caching data accessible to a plurality of interconnected computing devices, each computing device contributing a portion of its main memory to the global cache;
   maintaining, by each of the computing devices, an ordering of data cached in its respective main memory portion, the ordering corresponding to values of the cached data;
   in response to a request for a cached datum, adjusting the ordering of data cached by the computing device supplying the requested datum; and
   adjusting the ordering of the data cached by the computing device receiving the requested datum.

2. The method as recited in claim 1, wherein adjusting the ordering of data cached by the supplying computing device comprises moving the requested datum a distance towards the least-valuable position in the ordering.

3. The method as recited in claim 2, wherein the distance is determined based on the number of replicas of the requested datum in the global cache.

4. The method as recited in claim 1, wherein adjusting the ordering of data cached by the requesting computing device comprises positioning the requested datum at a distance removed from the most-valuable position in the ordering.

5. The method as recited in claim 4, wherein the distance is determined based on a number of replicas of the requested datum in the global cache.

6. The method as recited in claim 1, wherein the ordering comprises a first ordered list and a second ordered list, wherein each computing device evicts cached data based on the second ordered list.

7. The method as recited in claim 6, wherein adjusting the ordering of data cached by the supplying computing device comprises moving the requested datum from its first ordered list to its second ordered list.

8. The method as recited in claim 6, wherein adjusting the ordering of data cached by the requesting computing device comprises placing the requested datum on its second ordered list.

9. The method as recited in claim 1, further comprising:
   selecting a first computing device to receive a datum evicted by a second computing device; and
   transferring, by the second computing device, the evicted datum to the first computing device.

10. The method as recited in claim 9, wherein selecting the first computing device comprises identifying a most popular datum in the global cache; and selecting a first computing device having the most popular datum cached in its main memory portion.

11. The method as recited in claim 9, wherein the first computing device is selected only if the datum evicted by the second computing device is a singlet.

12. A method of caching data in a global cache distributed amongst a plurality of computing devices, comprising:
   providing a global cache for caching data accessible to a plurality of interconnected computing devices, each computing device contributing a portion of its main memory to the global cache;
   evicting by a first computing device a first datum cached in its main memory portion;
   determining a second datum cached in the global cache that has a greater number of replicas in the global cache than the first datum;
   determining a second computing device having the second datum cached in its main memory portion; and
   forwarding the first datum to the second computing device.

13. The method as recited in claim 12, further comprising directing the second computing device to evict the second datum upon receipt of the forwarded first datum.

14. The method as recited in claim 12, wherein determining the second datum comprises determining a second datum that has a greatest number of replicas in the global cache.

15. The method as recited in claim 12, wherein the second datum is determined only if the first datum is a singlet.

16. The method as recited in claim 12, further comprising:
   maintaining, by each of the computing devices, an ordering of data cached in its respective main memory portion, the ordering corresponding to values of the cached data;
   in response to a request for a cached datum, adjusting the ordering of data cached by the computing device supplying the requested datum; and
   adjusting the ordering of the data cached by the computing device receiving the requested datum.

17. A computing system, comprising:
   a plurality of interconnected computing devices, each computing device having a main memory; and
   a global cache for caching data accessible by the computing devices, the global cache comprising a portion of the main memory of each computing device,
   wherein each of the computing devices is configured to maintain an ordering of data cached in its respective portion of main memory, and wherein, in response to a request for a cached datum from a first computing device, a second computing device is configured to supply the requested datum and adjust its ordering of cached data, and wherein, in response to receipt of the requested datum, the first computing device is configured to adjust its ordering of cached data.

18. The system as recited in claim 17, further comprising a management device in communication with the plurality of computing devices, wherein the management device is configured to maintain a mapping of data cached in the global cache to computing devices storing the data in their respective main memory portions.

19. The system as recited in claim 18, wherein the management device is configured to direct a first computing device to forward a first datum evicted by the first computing device to a selected second computing device if the first datum is a singlet.

20. The system as recited in claim 19, wherein the management device selects the second computing device based on a popularity of a second datum stored in the main memory portion of the second computing device.

* * * * *